(12) United States Patent
Molin et al.

(10) Patent No.: US 9,871,584 B2
(45) Date of Patent: Jan. 16, 2018

(54) METHOD OF CHARACTERIZING A MULTIMODE OPTICAL FIBER LINK AND CORRESPONDING METHODS OF FABRICATING MULTIMODE OPTICAL FIBER LINKS AND OF SELECTING MULTIMODE OPTICAL FIBERS FROM A BATCH OF MULTIMODE OPTICAL FIBERS

(71) Applicant: Draka Comteq B.V., Amsterdam (NL)

(72) Inventors: Denis Molin, Draveil (FR); Pierre Sillard, Le Chesnay (FR); Marianne Bigot-Astruc, Janvry (FR)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 15/028,619

(22) PCT Filed: Oct. 15, 2013

(86) PCT No.: PCT/IB2013/002806
§ 371 (c)(1),
(2) Date: Apr. 11, 2016

(87) PCT Pub. No.: WO2015/056044
PCT Pub. Date: Apr. 23, 2015

(65) Prior Publication Data
US 2016/0254861 A1   Sep. 1, 2016

(51) Int. Cl.
*H04B 10/00* (2013.01)
*H04B 10/079* (2013.01)
(Continued)

(52) U.S. Cl.
CPC ..... *H04B 10/07951* (2013.01); *G01M 11/332* (2013.01); *G01M 11/338* (2013.01); *H04B 10/0731* (2013.01); *H04B 10/2581* (2013.01)

(58) Field of Classification Search
USPC .................................... 398/25–28
See application file for complete search history.

(56) References Cited

U.S. PATENT DOCUMENTS

| | | | | |
|---|---|---|---|---|
| 4,286,979 A | * | 9/1981 | Buckler | C03B 37/0253 356/73.1 |
| 6,064,786 A | * | 5/2000 | Cunningham | H04B 10/2581 383/27 |

(Continued)

FOREIGN PATENT DOCUMENTS

| | | |
|---|---|---|
| EP | 2144096 A1 | 1/2010 |
| EP | 2207022 A1 | 7/2010 |

(Continued)

OTHER PUBLICATIONS

International Preliminary Report on Patentability in counterpart International Application No. PCT/IB2013/002806 dated Apr. 19, 2016, pp. 1-7 [All references previously cited].

(Continued)

*Primary Examiner* — Agustin Bello
(74) *Attorney, Agent, or Firm* — Additon, Higgins & Pendleton, P.A.

(57) ABSTRACT

The invention concerns a method of characterizing a multimode optical fiber link comprising a light source and a multimode fiber, which comprises: a step (170) of characterizing the multimode fiber using a measurement of the Dispersion Modal Delay (DMD) and delivering fiber characteristic data; a step (171) of characterizing the light source by at least three source characteristic curves showing three parameters of the source as a function of a fiber radius r and obtained by a technique similar to the DMD measurement; a step (173) of computing an Effective Bandwidth (EB) of the link, comprising calculating (172) a transfer function using both the fiber characteristic data and each of said source characteristic curves.

17 Claims, 8 Drawing Sheets

(51) Int. Cl.
  *G01M 11/00* (2006.01)
  *H04B 10/073* (2013.01)
  *H04B 10/2581* (2013.01)

(56) References Cited

U.S. PATENT DOCUMENTS

| | | | |
|---|---|---|---|
| 6,400,450 B1* | 6/2002 | Golowich | G01M 11/332 356/73.1 |
| 6,618,534 B2* | 9/2003 | Abbott, III | C03B 37/01413 385/123 |
| 6,724,965 B2* | 4/2004 | Abbott, III | C03B 37/01413 385/123 |
| 6,788,397 B1* | 9/2004 | Golowich | G01M 11/33 356/121 |
| 7,659,969 B2* | 2/2010 | Behr | H04B 10/07 356/73.1 |
| 7,945,159 B2* | 5/2011 | Pape | G01M 11/333 398/25 |
| 7,995,888 B2* | 8/2011 | Gholami | G01M 11/338 385/122 |
| 8,260,103 B2 | 9/2012 | Gholami et al. | |
| 8,351,027 B2* | 1/2013 | Pimpinella | G01M 11/338 356/73.1 |
| 8,432,539 B2 | 4/2013 | Gholami et al. | |
| 8,488,115 B2* | 7/2013 | Pimpinella | G01M 11/338 356/73.1 |
| 8,489,369 B2* | 7/2013 | Lane | G01M 11/332 356/29 |
| 8,531,654 B2* | 9/2013 | Tudury | G01M 11/335 356/73.1 |
| 8,797,519 B2* | 8/2014 | Chen | H04B 10/2581 356/73.1 |
| 8,922,763 B2* | 12/2014 | Tudury | G01M 11/335 356/73.1 |
| 9,304,058 B2* | 4/2016 | Fini | G01M 11/331 |
| 9,377,377 B2* | 6/2016 | Chen | G01M 11/333 |
| 9,377,579 B2* | 6/2016 | Molin | G02B 6/0288 |
| 9,411,096 B2* | 8/2016 | Pimpinella | G02B 6/0288 |
| 2010/0028020 A1* | 2/2010 | Gholami | G01M 11/338 398/159 |
| 2010/0171945 A1* | 7/2010 | Gholami | G02B 6/0288 356/73.1 |
| 2011/0037183 A1 | 2/2011 | Tudury et al. | |
| 2011/0044594 A1 | 2/2011 | Tudury et al. | |
| 2011/0054861 A1 | 3/2011 | Lane et al. | |
| 2011/0293290 A1 | 12/2011 | Gholami et al. | |
| 2012/0099099 A1* | 4/2012 | Tudury | G01M 11/335 356/73.1 |
| 2013/0100437 A1* | 4/2013 | Molin | G02B 6/0288 356/51 |
| 2014/0204367 A1* | 7/2014 | Tudury | G01M 11/335 356/73.1 |
| 2016/0041332 A1* | 2/2016 | Pimpinella | G02B 6/0288 385/124 |
| 2016/0254861 A1* | 9/2016 | Molin | G01M 11/332 |

FOREIGN PATENT DOCUMENTS

| | | |
|---|---|---|
| EP | 2584388 A1 | 4/2013 |
| WO | 2010/147841 A1 | 12/2010 |
| WO | 2015/056044 A1 | 4/2015 |

OTHER PUBLICATIONS

International Search Report in counterpart International Application No. PCT/IB2013/002806 dated Jun. 27, 2014, pp. 1-3.
Sengupta, "Calculated Modal Bandwidths of an OM4 Fiber and the Theoretical Challenges" by International Wire & Cable Symposium, Proceedings of the 581th IWCS/IICIT, pp. 24-29.

* cited by examiner

METHOD OF CHARACTERIZING A MULTIMODE OPTICAL FIBER LINK AND CORRESPONDING METHODS OF FABRICATING MULTIMODE OPTICAL FIBER LINKS AND OF SELECTING MULTIMODE OPTICAL FIBERS FROM A BATCH OF MULTIMODE OPTICAL FIBERS

1. FIELD OF THE INVENTION

The present invention relates to the filed of optical fiber transmissions, and more specifically, to multimode fibers used in relative long reach and high bitrate systems. More specifically, the invention relates to a method of characterizing a multimode optical fiber link, comprising a light source and one or several multimode fibers, used in such optical transmission systems.

2. BACKGROUND

Multimode fibers are successfully used in high-speed data networks together with high-speed sources that are typically using transversally multimode vertical cavity surface emitting lasers, more simply called VCSELs.

The Effective Bandwidth drives the performance of a system comprising a multimode fiber and a light source such as a VCSEL, and allows assessing the highest bit rate achievable and/or the longest reach achievable.

The Effective Bandwidth results from the combination of the modal dispersion and the chromatic dispersion.

Modal dispersion results from the fact that, in a multimode fiber, for a particular wavelength, several optical modes propagate simultaneously along the fiber, carrying the same information, but travelling with different propagation velocities. Modal dispersion is expressed in terms of Differential Mode Delay (DMD), which is a measure of the difference in pulse delay (ps/m) between the fastest and slowest modes traversing the fiber.

In order to minimize modal dispersion, the multimode optical fibers used in data communications generally comprise a core showing a refractive index that decreases progressively going from the center of the fiber to its junction with a cladding. In general, the index profile is given by a relationship known as the "α profile", as follows:

$$n(r) = n_0 \sqrt{1 - 2\Delta\left(\frac{r}{a}\right)^\alpha} \text{ for } r \leq a,$$

where:
$n_0$ is a refractive index on an optical axis of a fiber;
r is a distance from said optical axis;
a is a radius of the core of said fiber;
$\Delta$ is a non-dimensional parameter, indicative of an index difference between the core and a cladding of the fiber; and
α is a non-dimensional parameter, indicative of a shape of the index profile.

When a light signal propagates in such a core having a graded index, the different modes experience a different propagation medium, which affects their speed of propagation differently. By adjusting the value of the parameter α, it is thus possible to theoretically obtain a group velocity, which is virtually equal for all the modes and thus a reduced intermodal dispersion for a particular wavelength. However, an optimum value of the parameter α is valid for a particular wavelength only. Furthermore, the exact parameter value α, as well as the actual shape of the refractive index profile, are difficult to control during manufacture of the fiber.

It is thus important to take account of modal dispersion when assessing the effective bandwidth of a multimode optical fiber link.

As mentioned above, the Effective Bandwidth is also affected by the chromatic dispersion, also called material dispersion. Chromatic dispersion occurs because the refractive index of a material changes with the wavelength of light. As a consequence, different wavelengths travel at different speeds in a multimode fiber. Since a pulse of light typically comprises several wavelengths, the spectral components of the optical signal spread in time, or disperse, as they propagate, causing the pulse width to broaden. A multimode fiber typically has a chromatic dispersion of the order of −100 ps/nm-km at a wavelength of 850 nm. The chromatic dispersion can vary between −80 and −120 ps/nm-km in the spectral range 840-860 nm.

Originally, modal and chromatic dispersions have been assumed to act independently. As a consequence, the Effective Bandwidth (EB), which corresponds to the bandwidth of the fiber when both the modal dispersion and the chromatic dispersion are taken into account, has long been assessed as the result of an independent combination of the Effective Modal Bandwidth (EMB), which corresponds to the bandwidth of the source-fiber pair when the chromatic dispersion is disregarded, and a Chromatic Dispersion Bandwidth (BWch).

More precisely, the Chromatic Dispersion Bandwidth is determined from the spectral width for the VCSEL, by taking account of the nominal value of the chromatic dispersion of the fiber. Actually, the chromatic dispersion is considered as not varying so much from fiber to fiber.

The Chromatic Dispersion Bandwidth is hence calculated as follows:

$$BW_{ch} = \frac{0.187}{L \cdot \sigma} \cdot \frac{10^{12}}{\sqrt{(D_1)^2 + (D_2)^2}} \text{ with } D_1 = \frac{S_0}{4} \cdot \left[\lambda_c - \frac{(\lambda_0)^4}{(\lambda_c)^3}\right] \text{ and } D_2 = 0.7 \cdot \sigma \cdot S_0,$$

where:
L is the link length in kilometers;
$\sigma$ is the root mean square (rms) optical spectral width of the laser source in nm;
$\lambda_0$ is the wavelength of zero dispersion of the fiber in nm;
$\lambda_c$ is the center wavelength of the laser;
$S_0$ is the dispersion parameter of the fiber in ps/(km·nm)$^2$.

As regards Effective Modal Bandwidth, it is usually estimated by a measurement of the delay due to the modal dispersion, known under the acronym DMD for "Dispersion Modal Delay" graphical representation. The DMD measurement procedure has been the subject of standardization (IEC 60793-1-49 and FOTP-220) and is also specified in Telecommunications Industry Association Document no. TIA-455-220-A. The DMD metric is expressed in units of picoseconds per meter (ps/m) so that the total delay is normalized by fiber length. Low modal dispersion as measured by DMD generally results in higher-bandwidth MMF.

A DMD graphical representation is obtained by injecting a light pulse having a given wavelength $\lambda_0$ at the center of the fiber and by measuring the pulse delay after a given fiber length L; the introduction of the light pulse of given wavelength $\lambda_0$ being radially offset to cover the entire core of the multimode fiber.

Once the Effective Modal Bandwidth and the Chromatic Dispersion Bandwidth have been assessed, the total bandwidth, also called Effective Bandwidth is calculated as follows:

$$EB = \frac{1}{\sqrt{\frac{1}{EMB^2} + \frac{1}{BW_{ch}^2}}}$$

However, for relatively long reach and at high bit rate, and especially in case of transversally multimode sources, source and fiber do not drive the system performance independently, because of Modal and Chromatic Dispersion Interactions (MCDI).

Actually, the sources used in optical transmission systems are generally not monochromatic. Thus, the widely used VCSELs have a wide-spectrum discrete emission. The VCSELs used for high-speed transmissions are generally longitudinally but not transversally single mode, each transverse mode of the laser having its own wavelength corresponding to the various peaks of the emission spectrum. The emission spectrum thus has a spatial dependence.

When the optical signal emitted by the VCSEL is introduced into the multimode fiber, each transverse mode of the VCSEL will diffract differently: the transverse modes of the highest order diverge more rapidly due to their phase and the spatial distribution of their energy, they will therefore be coupled more specifically in the high order modes of the fiber. It will be recalled that the high order modes of the VCSEL occupy the lowest wavelengths in the spectrum. This spectral and spatial distribution of the VCSEL modes results in the highest order modes of the fibers mostly carrying the lowest wavelengths in the spectrum: the chromatic dispersion will therefore further delay the higher order modes relative to the delay of the fundamental mode.

The chromatic dispersion will thus introduce a modal dispersion referred to by the acronym MCDI for "Modal and Chromatic Dispersion Interferences", resulting in a limitation of the bandwidth.

Document US 2011/0054861 A1 stresses the fact that the currently standardized algorithms for determining DMD and EMB, though adequate for appraising the quantitative amount of modal dispersion of a particular fiber at a particular measurement wavelength, do not correctly address both modal and chromatic dispersion effects, and discloses an improved algorithm for calculating the bandwidth of a particular laser transmitter and fiber combination, aiming at correctly combining both modal and chromatic dispersion effects.

According to this prior art document, a total bandwidth accounting for both chromatic and modal dispersions is assessed through the computation of a transfer function $H_{fiber}(f,n)$, determined by deconvolving the launch reference pulse $R(t)$ used in the DMD measurements, from the output temporal responses $P_{cd}(t,n)$, as follows:

$$H_{fiber}(f,n)=FT\{P_{cd}(t,n)\}/FT\{R(t)\}$$

with $$P_{cd}(t,n)=\Sigma_r D_{cd}(r,t,n)=U_{cd}(r,t)W(r,n)$$

and $$U_{cd}(r,t)=FT^{-1}\{FT\{U(r,t)\}\cdot H_{cd}(f,r)\}$$

where $U(r,t)$ are the temporal responses of the multimode fiber optical cable, measured using spectrally narrow and temporally short pulses of light with central wavelength $\lambda_c$, injected into a core of the multimode fiber optic cable at series of radial offsets r from the core, and where $U_{cd}(f,r)$ is the chromatic dispersion transfer function calculated at the radial offset r from the Time Of Flight TOF($\lambda$) and the optical spectrum of the transceiver measured at offset r L ($\lambda$,r):

$$H_{cd}(f,r)=FT\{L(\lambda,r)TOF(\lambda)\}.$$

Although it attempts to take account of both modal and chromatic dispersion for characterizing a multimode fiber system, such a method shows several drawbacks.

First, such a method does not differentiate between the source characterization and the fiber characterization.

Secondly, such a method does not disclose how to use the source and fiber metrics to derive the Effective Bandwidth of a multimode optical fiber link, but only allows determining a bandwidth range, and perhaps a minimum bandwidth of a fiber and a population of laser transmitters.

Yet, the Effective Bandwidth value of a multimode optical fiber link is very useful to optimize the system performance, to assess its reach, to assess power penalties or a maximum bit rate achievable for example.

It would hence be desirable to have an improved method for assessing the effective bandwidth of a system comprising a source and a multimode fiber, which would take account of both chromatic and modal dispersion effects.

It would also be desirable to have such a method that does not require in situ measurements. It would also be desirable to obtain new metrics that would characterize the source and the multimode fiber, and that could be used to predict system performances.

3. SUMMARY

In one aspect, a method of characterizing a multimode optical fiber link comprising a light source and at least one multimode fiber is provided. Such a method comprises a step of characterizing the multimode fiber using a measurement of the Dispersion Modal Delay (DMD) and delivering fiber characteristic data. Such a method also comprises:

a step of characterizing the light source by at least three source characteristic curves obtained by:
  exciting a nominal multimode fiber with the light source;
  scanning with a single mode fiber an output signal of the nominal multimode fiber, at different radial offset values r, from an axis of said nominal fiber where r=0 to a radial offset value r=a, where a is the core radius of the nominal fiber,
  analyzing with a spectrum analyzer an output optical spectrum of the single mode fiber for each radial offset value r,
the source characteristic curves each showing a source parameter as a function of the radial offset value r;
a step of computing an Effective Bandwidth (EB) of the link, comprising calculating a transfer function using both the fiber characteristic data and each of the source characteristic curves.

The invention thus relies on a new and inventive approach of the characterization of multimode optical fiber links. It is actually based on the finding that source and fiber do interact on the system performance, and that it is thus not reliable to compute separately the Effective Modal Bandwidth and the Chromatic Dispersion Bandwidth to take account of both the modal and chromatic dispersion phenomena.

The method according to an embodiment of the invention allows isolating the relevant metrics that characterize the source and the fiber, and provides a new way of processing them to assess the Effective Bandwidth of the optical link. In other words, according to such a method, the fiber and the source can be characterized separately, without the need to make the link physically to assess its potential. Yet, the interaction between modal and chromatic dispersions is restored.

The characterization of the source relies on a new technique, which is somehow similar in its approach to the DMD measurement technique as specified in IEC 60793-1-49 and FOTP-220 standards. The characterization of the multimode fiber relies on this standardized DMD measurement technique.

Such a method for characterizing a multimode optical fiber link can advantageously be used in the framework of fiber manufacturing to support a method of qualifying fibers offering a minimal EB for a given set of transceivers. It may also be used for qualifying the effect of additional active or passive components inserted in a link, through the monitoring of their effect on the source and/or fiber metrics, as well as the consequences on the Effective Bandwidth of a link.

Moreover, this method is not limited to the 840-860 nm wavelength range, and can be applied for sources emitting over the whole available spectrum range available for data communications with optical fibers, for instance over the 633-1625 nm range and even beyond 1625 nm, around 2 μm for instance. It is not either limited to VCSEL based sources, and can be used with DFB (for "Distributed FeedBack") lasers, LED (for "Light Emitting Diodes") or Silicon Photonic sources for instance. It is particularly suited to spectrally wide sources, transversally and/or longitudinally multimode sources.

Moreover, this method is not limited to 50 μm graded-index multimode fibers: it can be applied to smaller core diameters from 10 to 50 μm or larger core diameters from 50 to 100 μm for instance. Moreover, this method is not limited to graded-index multimode fibers and is particularly suited to any fiber sustaining more than one mode at the operating wavelengths of interest.

As used herein multimode optical fiber is an optical fiber able to transmit more than one mode at the intended operating wavelengths.

In another aspect, said source characteristic curves comprise:
- a curve showing an output power $P(r)$ of said source as a function of said radial offset value r, $0 \leq r \leq a$;
- a curve showing a center wavelength $\lambda_c(r)$ of said source as a function of said radial offset value r, $0 \leq r \leq a$;
- a curve showing a root mean square spectral width $\Delta\lambda(r)$ of said source as a function of said radial offset value r, $0 \leq r \leq a$.

The method according to an embodiment of the invention thus advantageously avoids the use of the full optical spectrum. It rather only considers the center wavelength $\lambda_c(r)$ and the spectral width RMS $\Delta\lambda(r)$ of the source. The inventors have actually demonstrated that such a method was sufficient to reach good results, which was far from being obvious, given the complexity of the spectrum shape.

Moreover, the method according to an embodiment of the invention advantageously uses the metric $\Delta\lambda(r)$ for characterizing the source, which is critical since it provides the right scaling of the resulting Effective Bandwidth that is mandatory for system margin calculations.

Advantageously, said nominal multimode fiber exhibits a length close to said link length. The characterization of the source is thus carried out in conditions similar to the actual optical link.

According to an aspect of the invention, said step of characterizing said multimode fiber and said step of characterizing said light source use the same single mode fiber, so as to avoid any discrepancy between the characterization of the source and of the fiber which would be induced by the use of different single mode fibers.

In a first particular embodiment of the invention, said step of computing an Effective Bandwidth (EB) of said link derives said Effective Bandwidth from a transfer function $H(f)$: where $$H(f) = \sum_{r=0}^{r=a} P(r) \cdot OMBc(r) \cdot \frac{\tilde{s}_{DMD}\left(r, f \cdot \frac{L}{L_{DMD}}\right)}{\tilde{s}_{ref}\left(f \cdot \frac{L}{L_{DMD}}\right)} \cdot e^{-i2\pi\Delta\tau(r)f} \cdot e^{-\frac{f^2}{\sigma(r)^2}}$$

with:

$$\Delta\tau(r) = L \cdot D \cdot (\lambda_c(r) - \lambda_{DMD})$$

$$\sigma(r) = \frac{0.187}{\Delta\lambda(r) \cdot L \cdot D \cdot \sqrt{0.3 \cdot \log_e 10}}$$

where:
$\tilde{s}_{DMD}(r,f)$ and $\tilde{s}_{ref}(f)$ are the Fourier transform of $s_{DMD}(r,t)$ and $s_{ref}(t)$,
L and $L_{DMD}$ are the multimode fiber length in said link and the multimode fiber length in DMD measurements respectively,
D is the chromatic dispersion of said nominal fiber expressed in ps/nm-km,
$\lambda_{DMD}$ is the wavelength of said measurement of the Dispersion Modal Delay,
$s_{DMD}(r,t)$ is a DMD trace at radial offset value r,
$s_{ref}(t)$ is a reference pulse signal,
and OMBc(r) is the OMBc (for "Overfilled Modal Bandwidth calculated") weight function. As an example, the Effective Bandwidth is calculated as the bandwidth at −3 dB of the H(f) transfer function, such that:

$$10 \cdot \log_{10}\left|\frac{H(EB)}{H(0)}\right| = -3.$$

Of course, other ways of deriving EB from H(f) could be used, such as by using a −1.5 dB threshold and multiplying the obtained bandwidth by $\sqrt{2}$, or by using a −6 dB threshold for example.

According to this first embodiment of the invention, the multimode fiber is characterized by using the full DMD plot.

The OMBc weight functions are the weight functions that correspond to over-filled launch as disclosed in "Calculated Modal Bandwidths of an OMA Fiber and the Theoretical Challenges" by Abhijit Sengupta, International Wire & Cable Symposium, Proceedings of the 58th IWCS/IICIT, pp. 24-29 for 50 μm graded-index MMFs. Note that the OMBc weight functions can be calculated for any refractive index profile and must be adapted to the nominal fiber profile.

According to a second particular embodiment of the invention, said step of characterizing said multimode fiber comprises a step of calculating at least three fiber characteristic curves from said measurement of said Dispersion Modal Delay, said fiber characteristic curves comprising:
- a curve showing a Radial Offset Bandwidth ROB(r) of said multimode fiber as a function of said radial offset value r, $0 \leq r \leq a$;
- a curve showing a Radial Offset Delay ROD(r) of said multimode fiber as a function of said radial offset value r, $0 \leq r \leq a$;
- a curve showing a Radial Coupling Power $P_{DMD}$(r) of said multimode fiber as a function of said radial offset value r, $0 \leq r \leq a$.

According to this second embodiment, the characterization of the multimode fiber uses relevant metrics extracted from the DMD plot, that are more simple and convenient to use, with minor lose of accuracy compared to the above first embodiment. The Radial Offset Bandwidth ROB(r) and the Radial Offset Delay ROD(r) are normalized to the fiber length used in the DMD measurements and are typically and respectively expressed in MHz·km and ps/m.

According to an aspect of this second embodiment, said step of computing an Effective Bandwidth (EB) of said link derives said Effective Bandwidth from a transfer function H(f):

where $$H(f) = \sum_{r=0}^{r=a} P(r) \cdot P_{DMD}(r) \cdot OMBc(r) \cdot e^{-i2\pi(\Delta\tau(r)+\Delta\tau_{DMD}(r))f} \cdot e^{-\left(\frac{1}{\sigma(r)^2}+\frac{1}{\sigma_{DMD}(r)^2}\right)f^2}$$

with:

$$\Delta\tau(r) = L \cdot D \cdot (\lambda_c(r) - \lambda_{DMD})$$

$$\sigma(r) = \frac{0.187}{\Delta\lambda(r) \cdot L \cdot D \cdot \sqrt{0.3 \cdot \log_e 10}}$$

$$\Delta\tau_{DMD}(r) = L \cdot \frac{\int t \cdot s_{DMD}(r,t) \cdot dt}{L_{DMD} \cdot \int s_{DMD}(r,t) \cdot dt} \sim L \cdot ROD(r)$$

$$\sigma_{DMD}(r) = \frac{ROB(r)}{L \cdot \sqrt{0.3 \cdot \log_e 10}}$$

where:

L is the multimode fiber length in said link, $L_{DMD}$ is a length of multimode fiber used in said measurement of the Dispersion Modal Delay, D is the chromatic dispersion of said nominal fiber expressed in ps/nm-km, $\lambda_{DMD}$ is the wavelength of said measurement of the Dispersion Modal Delay, $s_{DMD}$(r,t) is a DMD trace at radial offset value r, and OMBc(r) is the OMBc (for "Overfilled Modal Bandwidth calculated") weight function.

As an example, the Effective Bandwidth is calculated as the bandwidth at −3 dB of the H(f) transfer function, such that:

$$10 \cdot \log_{10}\left|\frac{H(EB)}{H(0)}\right| = -3.$$

or course, other ways of deriving EB from H(f) could be used, such as by using a −1.5 dB threshold and multiplying the obtained bandwidth by √2, or by using a −6 dB threshold for example.

It should be noted that $s_{DMD}$(r,t) and $s_{ref}$(t) are normalized to the fiber length used in the DMD measurements $L_{DMD}$, and the t argument in $s_{DMD}$ t) and $s_{ref}$(t) is thus expressed in s/m. The OMBc weight functions are the weight functions disclosed in "Calculated Modal Bandwidths of an OM4 Fiber and the Theoretical Challenges" by Abhijit Sengupta, International Wire & Cable Symposium, Proceedings of the 58$^{th}$ IWCS/IICIT, pp. 24-29, but tuned to account for the refractive index profile of the nominal fiber.

According to another embodiment of the invention, said chromatic dispersion D in $\Delta\tau$(r) is replaced by a function of the radius D(r), such that:

$$\Delta\tau(r) = L \cdot D(r) \cdot (\lambda_c(r) - \lambda DMD).$$

Actually, both methods described above in relation to the first and second embodiments of the invention work fine when $\lambda_c$(r) is close to the $\lambda_{DMD}$ wavelength. However, some discrepancy may occur when $\lambda_c$(r) is too different from the $\lambda_{DMD}$ wavelength. This comes from the fact that Dispersion Modal Delay DMD varies with the operating wavelength $\lambda_{DMD}$ used during the DMD measurements. To account for this phenomenon, one can correct the transfer functions H(f) used in both the first and second embodiments of the invention, by modifying the chromatic dispersion D in the equation of $\Delta\tau$(r) by a function D(r) of the radius.

Preferably, $D(r)=D_0+a \cdot r^2+b \cdot r$, where $D_0$, a and b are coefficients calculated for example using a method belonging to the group comprising:
- chromatic dispersion measurements along radius with DMD like excitations;
- comparing ROD curves obtained at two different wavelengths.

The invention also concerns a method of fabricating multimode optical fiber links comprising a light source and a multimode fiber, the method comprising:
- selecting a set of multimode optical fibers and a set of light sources;
- for each multimode optical fiber and for each light source in said sets, characterizing the multimode optical fiber link formed with said multimode optical fiber and said light source in compliance with the method of any of claims 1 to 9;
- selecting only those multimode optical fiber links for which the effective bandwidth EB>3000 MHz-km, more preferably EB>4500 MHz-km, even more preferably EB>6000 MHz-km.

The invention also concerns a method of selecting multimode optical fibers from a batch of multimode optical fibers, the method comprising:
- selecting a batch of multimode optical fibers and a set of light source metrics;
- for each multimode optical fiber and each light source metric in said set, characterizing the multimode optical fiber link formed with said multimode optical fiber and said light source metric in compliance with the method of any of the claims 1 to 9;
- selecting only those multimode optical fibers for which the minimal calculated effective bandwidth over the whole set of light source metrics is >3000 MHz-km, more preferably >4500 MHz-km, even more preferably >6000 MHz-km, wherein the set of light source metrics is obtained through measuring or modeling a representative set of light sources.

More generally, the Effective Bandwidth computed according to the method of characterizing a multimode optical link of the invention can be used:

- To sort out/to optimize fibers for a given source or set of sources to optimize system performance (low penalties) and/or to extend the reach;
- To sort out/to optimize sources for a given fiber or set of fibers to optimize system performance (low penalties) and/or to extend the reach;
- To assess power penalties/system margins for a given link length and bit rate;
- To assess system reach for a given power penalty level/system margins for a given bit rate;
- To assess maximum bit rate achievable for a given power penalty/system margins and given link length.

4. BRIEF DESCRIPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the invention.

5. DETAILED DESCRIPTION

The general principle of the invention relies on separate source and fiber characterizations, allowing isolating the relevant metrics that characterize both the source and the fiber, and a new method for assessing the Effective Bandwidth, starting from these new metrics.

Figure 17:
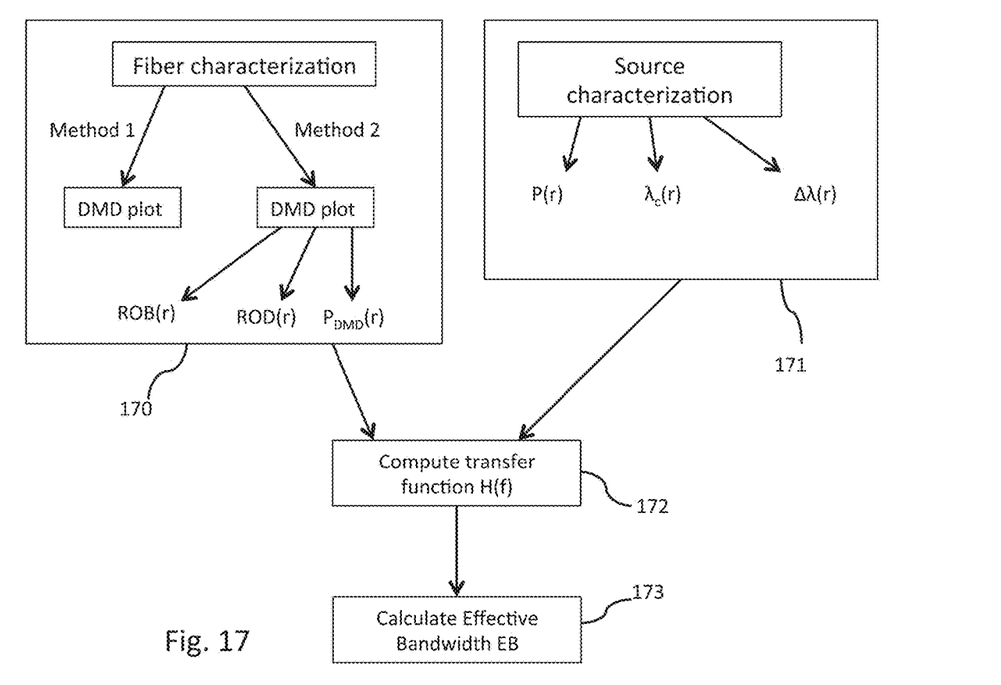
FIG. 17 shows a synoptic diagram of the method of characterizing a multimode optical fiber link according to the invention.

FIG. 17 illustrates by a synoptic diagram the method of characterizing a multimode optical fiber link according to the invention. Such a method relies on a characterization 170 of the multimode fiber using a DMD measurement technique. According to embodiments of the invention, as will appear more clearly in the foregoing, the fiber characteristic data are either the DMD plot itself (method 1, also referred to as the first embodiment of the invention), or three fiber characteristic curves derived from the DMD plot (method 2, also referred to as the second embodiment of the invention).

Such a method also relies on a separate characterization 171 of the source, using a technique similar to the DMD measurement technique, which allows obtaining three source characteristic curves.

Both the fiber characteristic data delivered by step 170 and the source characteristic curves delivered by step 171 feed a computing step 172 for computing a transfer function H(f). In a step 173, the Effective Bandwidth of the multimode optical fiber link is then derived from the transfer function H(f).

All these steps will be described in more details below in relation to the other figures.

Figure 1:
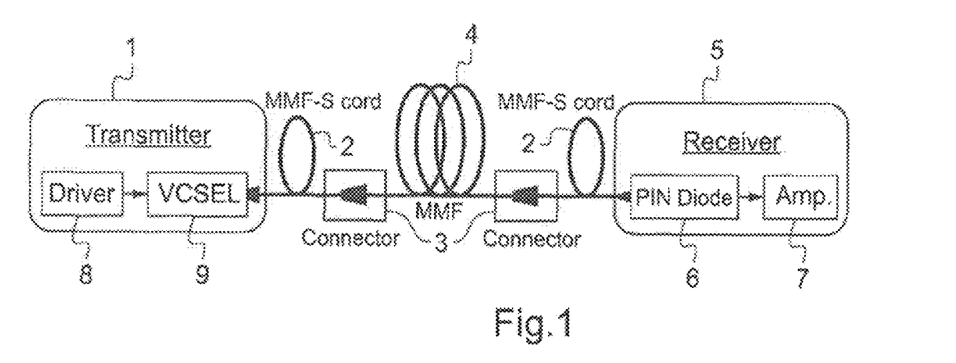
FIG. 1 shows an example of an optical communication system including a multimode fiber.

FIG. 1 shows an example of an optical communication system including a multimode fiber, which is an exemplary subject of the present effective bandwidth computing method. A multi Gigabits Ethernet optical communication system successively comprises a driver 8 of a transmitter 1, a VCSEL source 9 of a transmitter 1, a launch cord 2, a connector 3, a multimode fiber 4, a connector 3, a launch cord 2, a PIN diode 6 of a receiver 5, an amplifier 7 of a receiver 5. A digital signal at 10 Gbps or 25 Gbps is generated by the driver 8, which directly modulates the VCSEL source 9.

For sake of simplification, we hereafter consider only one multimode fiber; however, the general principles described below will be easily extended to the case where several multimode fibers are concatenated to form a link.

According to embodiments of the invention, the multimode fiber 4 characterization is mainly based on the DMD measurements, as described in the standard TIA FOTP-220 or IEC 60793-1-49 (TIA-455-220-A, "Differential Mode Delay Measurement of Multimode Fiber in the Time Domain" (January 2003)).

Figure 2:
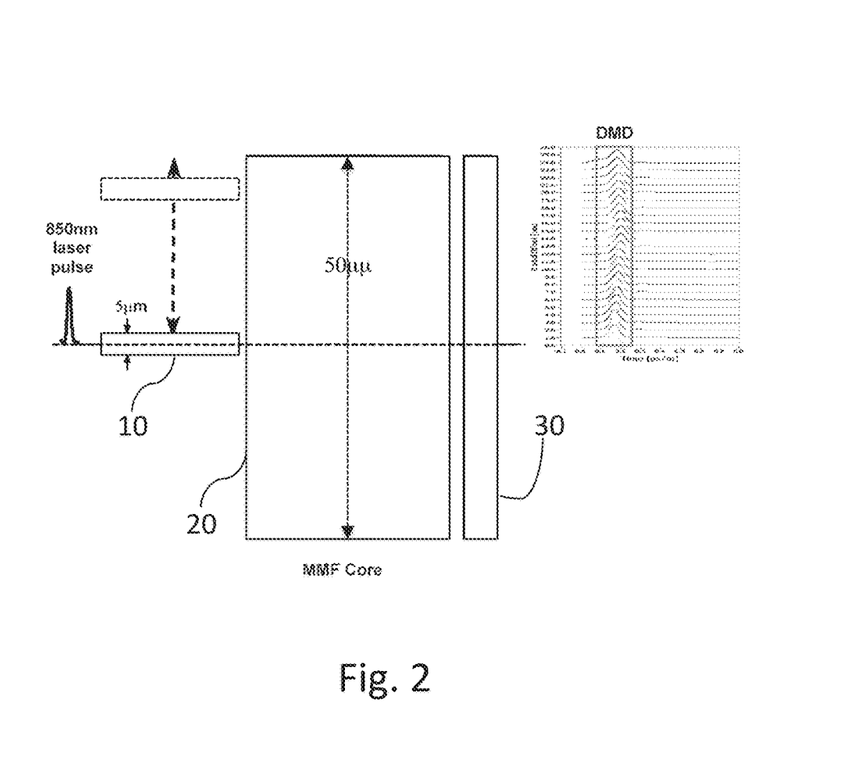
FIG. 2 illustrates the DMD measurement technique.

FIG. 2 illustrates the DMD measurement technique. An ultrafast laser pulse is launched into a multimode fiber MMF using a single mode fiber SMF. The SMF is scanned radially, and for each radial offset position, the shape of the transmitted pulse is recorded using a high bandwidth optical receiver 30 and a sampling oscilloscope.

More precisely, an optical reference pulse $s_{ref}(t)$ at 850 nm is emitted by a source and launched into the core 10 of a single-mode launch fiber SMF, with a core diameter of 5 μm. From the end of the SMF, it is stepped across the core 20 of a multimode fiber MMF under test. Such a MMF has typically a core diameter of 50 μm. For each lateral offset across the core (0 to 24 microns), the propagation delay of the resultant output pulse is recorded. Each output pulse contains only those modes excited at a given input radial position. The output waveforms for each of the radial offsets are plotted along the vertical axis and are displaced by 1-micron increments, as shown on the right part of FIG. 2, also called a DMD plot. The relative pulse delay for each waveform is plotted along the horizontal axis in units of picoseconds per meter (ps/m). The DMD is determined by first measuring the difference pulse in delay using the leading edge of the fastest pulse and the trailing edge of the slowest pulse. From this difference we subtract the temporal width of the launch pulse, which yields the modal dispersion of the fiber.

Figure 3:
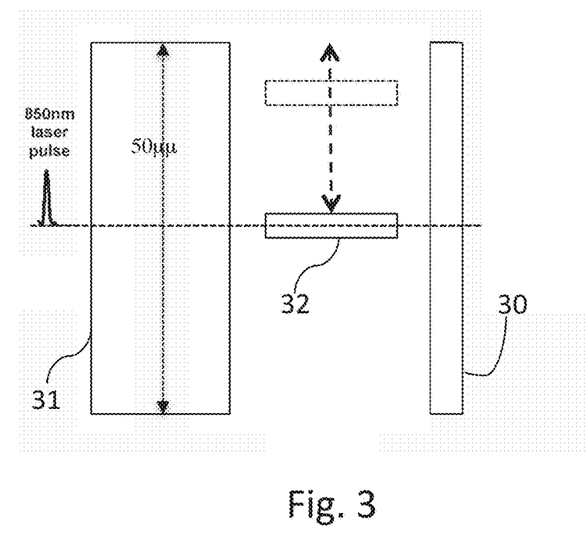
FIG. 3 illustrates the source characterization technique according to embodiments of the invention.

FIG. 3 illustrates the source characterization technique according to embodiments of the invention. This characterization is similar to that of the DMD measurement technique.

A nominal multimode graded-index fiber, with a core 31 showing a diameter of 50 μm, is first excited with the source to be characterized. Such a nominal multimode graded-index fiber has sensibly the same core diameter, numerical aperture and single alpha graded index profile as the multimode fiber used in the link. A single mode fiber 32 scans the output of the nominal fiber, in a manner similar to that used in the standard DMD measurements, thus preferably from 0 to 25 μm, with a 1-micron step. An optical spectrum analyzer 30 placed at the output of the single mode fiber 32 records the output optical spectrum for each position of the SMF.

Without lack of generality, the single mode fiber 32 used for the source characterization may be the same as the single mode fiber 10 used for the fiber characterization.

Although not illustrated on FIG. 3, such a technique allows collecting a series of optical spectra, which have to be post-processed, so as to generate three source characteristic curves, namely:
- a curve showing an output power P(r) of the source as a function of the radial offset value r of the SMF 32, 0≤r≤a. Such a power may be expressed as a relative power;
- a curve showing a center wavelength $\lambda_c(r)$ of the source as a function of the radial offset value r of the SMF 32, 0≤r≤a;
- a curve showing a root mean square spectral width $\Delta\lambda(r)$ of said source as a function of the radial offset value r of the SMF 32, 0≤r≤a, where a is the core radius of the multimode nominal fiber 31.

Figure 4:
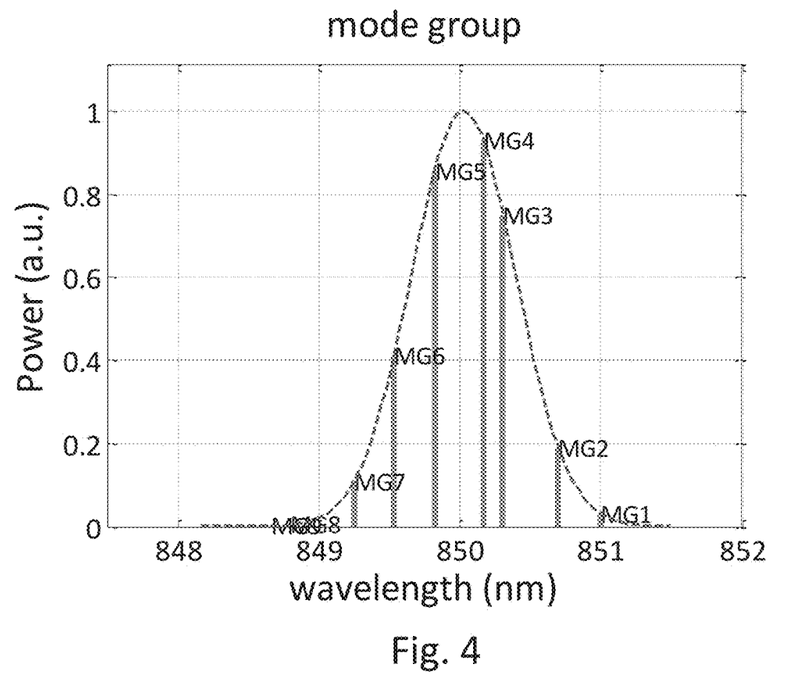
FIG. 4 shows the optical spectrum of a source characterized with the technique of FIG. 3 in an exemplary embodiment of the invention.

In a first exemplary embodiment of the invention, the inventors have simulated the coupling between a transversally multimode (and longitudinally single mode) laser into a 50 μm graded-index multimode fiber. As shown in FIG. 4, such a source exhibits nine mode groups, named MG1 to MG9. As can be read on FIG. 4, the center wavelength $\lambda_c$ is 850.0 nm, and the spectral width RMS is 0.35 nm. The waist of laser (i.e. the spot radius of the fundamental mode) is 3 μm. The position of the source with respect to the nominal multimode fiber 31 is arbitrarily chosen. The resulting insertion loss is less than 0.25 dB. The resulting encircled flux at the output of single-mode fiber 32 is 17.1 μm 86% EF radius & 15.8% EF at 4.5 μm.

Figure 5:
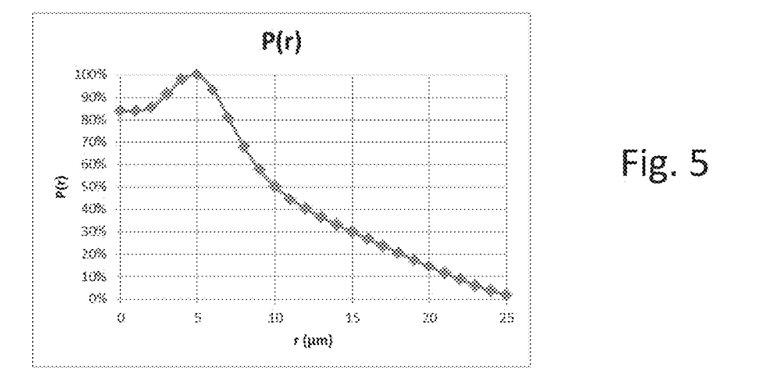
FIG. 5 illustrates the output power P(r) as a function of the radial offset value of a source characterized with the technique of FIG. 3 in an exemplary embodiment of the invention.
Figure 6:
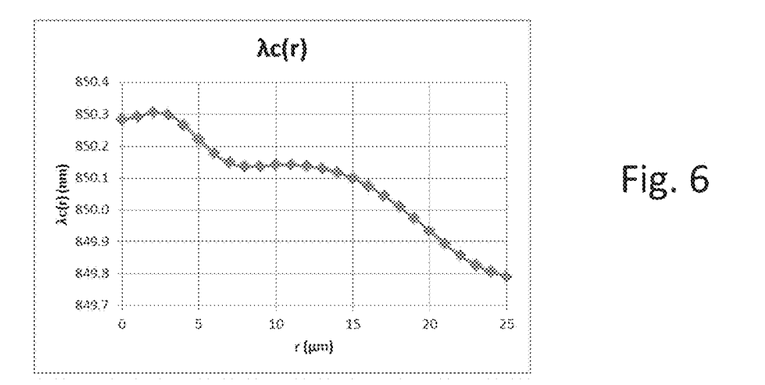
FIG. 6 depicts the center wavelength $\lambda_c(r)$ as a function of the radial offset value of a source characterized with the technique of FIG. 3 in an exemplary embodiment of the invention.
Figure 7:
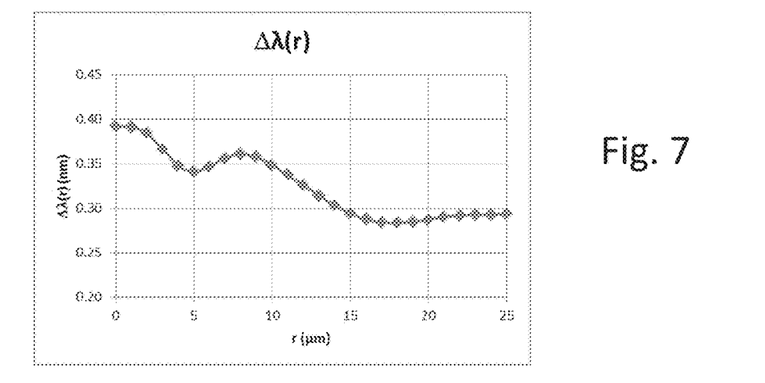
FIG. 7 illustrates the root mean square spectral width $\Delta\lambda(r)$ as a function of the radial offset value of a source characterized with the technique of FIG. 3 in an exemplary embodiment of the invention.

FIGS. 5, 6 and 7 illustrate the three curves that characterize the source-fiber coupling, according to the technique of FIG. 3: more precisely, FIG. 5 illustrates the output power P(r) of the source as a function of the radial offset value; FIG. 6 illustrates the center wavelength $\lambda_c(r)$ of the source as a function of the radial offset value; FIG. 7 depicts the root mean square spectral width $\Delta\lambda(r)$ of the source as a function of the radial offset value. It is interesting to note that the RMS spectral width $\Delta\lambda(r)$ also significantly varies along the fiber core 31.

Once a DMD measurement has been carried out for characterizing the multimode fiber under test, and once the source has been characterized using the technique of FIG. 3, the method of the invention proposes to compute the Effective Bandwidth of the multimode optical fiber link.

According to a first embodiment, the Effective Bandwidth (hereafter called EB3) is computed as the bandwidth at −3 dB of the transfer function H(f), such that:

$$10 \cdot \log_{10}\left|\frac{H(EB3)}{H(0)}\right| = -3,$$

with:

$$H(f) = \sum_{r=0}^{r=a} P(r) \cdot OMBc(r) \cdot \frac{\tilde{s}_{DMD}\left(r, f \cdot \frac{L}{L_{DMD}}\right)}{\tilde{s}_{ref}\left(f \cdot \frac{L}{L_{DMD}}\right)} \cdot e^{-i2\pi\Delta\tau(r)f} \cdot e^{-\frac{f^2}{\sigma(r)^2}}$$

$$\Delta\tau(r) = L \cdot D \cdot (\lambda_c(r) = \lambda_{DMD})$$

$$\sigma(r) = \frac{0.187}{\Delta\lambda(r) \cdot L \cdot D \cdot \sqrt{0.3 \cdot \log_e 10}}$$

where:
$\tilde{s}_{DMD}(r,f)$ and $\tilde{s}_{ref}(f)$ are the Fourier transform of $s_{DMD}(r,t)$ and $s_{ref}(t)$, L is the multimode fiber length in said link (e.g. 500 m), D is the chromatic dispersion of the nominal fiber expressed in ps/nm-km (e.g. −100 ps/nm-km) (the nominal fiber has preferably the same dopants content as the multimode fiber under test), $\lambda_{DMD}$ is the wavelength of the measurement of the Dispersion Modal Delay, $S_{DMD}(r,t)$ is a DMD trace at radial offset value r, $s_{ref}(t)$ is a reference pulse signal, and OMBc(r) is the OMBc (for "Overfilled Modal Bandwidth calculated") weight function.

More information on OMBc weight functions can be found in "Calculated Modal Bandwidths of an OM4 Fiber and the Theoretical Challenges" by Abhijit Sengupta, International Wire & Cable Symposium, Proceedings of the 58$^{th}$ IWCS/IICIT, pp. 24-29. As disclosed in this document, overfilled modal bandwidth calculated (OMBc) of a multimode fiber can be predicted from the weighted linear combination of differential modal delay data.

Actually, coupled power in each mode is calculated from the overlap integral of a Gaussian mode field of a single mode probe fiber (SMPF) and the specific mode of the MMF for each radial offset position. The coupling efficiency at each radial offset is calculated as the total coupled power summed over all modes normalized to unit incident power. The overfilled launch source is expressed as a linear combination of SMPF modes fields at the radial offset positions of the DMD scan. Per the definition of OFL, the weights for different offset positions are optimized so that the total energy in each mode of the MMF is equal. These theoretical DMD weighting values are tabulated to obtain the OMBc for the DMD data measured from 0-30 microns (i.e. complete DMD data). These weights are then adjusted to provide optimal values for the case where the DMD data does not exist at radii higher than 25 microns.

According to a second embodiment of the invention, the Effective Bandwidth is not calculated straight away from the DMD plot and the three source-characteristic curves, but three curves that characterize the multimode fiber have first to be calculated from the DMD plot:

- a curve showing a Radial Offset Bandwidth ROB(r) of the multimode fiber as a function of the radial offset value r, $0 \leq r \leq a$;
- a curve showing a Radial Offset Delay ROD(r) of the multimode fiber as a function of the radial offset value r, $0 \leq r \leq a$;
- a curve showing a Radial Coupling Power $P_{DMD}(r)$ of the multimode fiber as a function of the radial offset value r, $0 \leq r \leq a$, which may be expressed as a relative power.

The Radial Offset Bandwidth is described in several prior art documents, among which patent document EP2207022. As described in this patent document, the radial offset bandwidth ROB(r) is defined as the −3 dB bandwidth of a transfer function $$H^r(f) = \frac{S_s(f, r)}{S_e(f)},$$

where:
$S_e(f)$ is the Fourier transform of the time profile of the inlet pulse $s_e(t)$, launched in the DMD measurement,
$S_s(f,r)$ is the Fourier transform of the time profile of the outlet pulse $s_s(t,r)$ for a radial offset r, at the output of the multimode fiber under test,
and f indicates frequency.

An interesting characteristic of the ROB is its high sensitivity to localized defects in refractive index. Hence, if the ROB decreases too quickly on increasing the radial offset r, then it is likely that the fiber presents an irregular index profile.

ROB is normalized to the fiber length in the DMD measurement and is generally expressed in MHz·km.

As regards the ROD, it corresponds to the mean temporal position of the fiber output response for a given delay.

The ROD curve for the fiber somehow corresponds to the $\lambda_c$ curve for the source, while the ROB curve for the fiber somehow corresponds to the $\Delta\lambda$ curve for the source.

ROD is normalized to the fiber length used in the DMD measurements to be expressed typically in ps/m.

Figure 18:
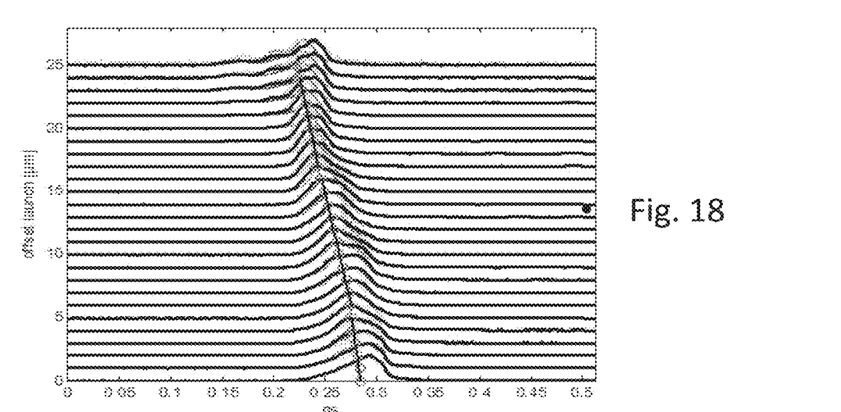
FIG. 18 shows an example of DMD plot resulting from a DMD measurement for a multimode fiber characterized according to an embodiment of the invention.
Figure 19:
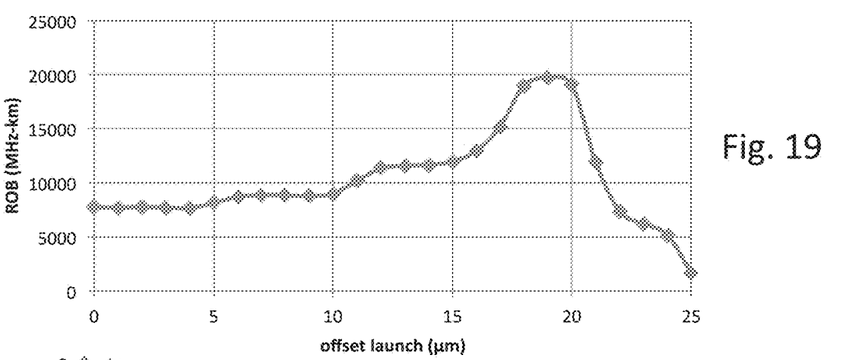
FIG. 19 illustrates the ROB curve derived from the DMD plot of FIG. 18.
Figure 20:
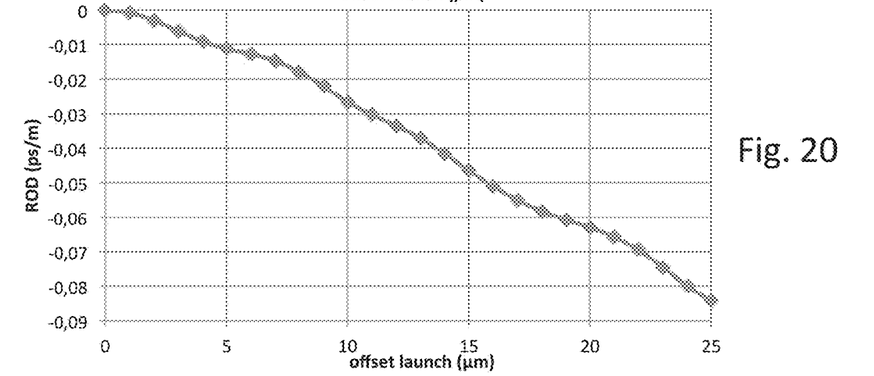
FIG. 20 illustrates the ROD curve derived from the DMD plot of FIG. 18.
Figure 21:
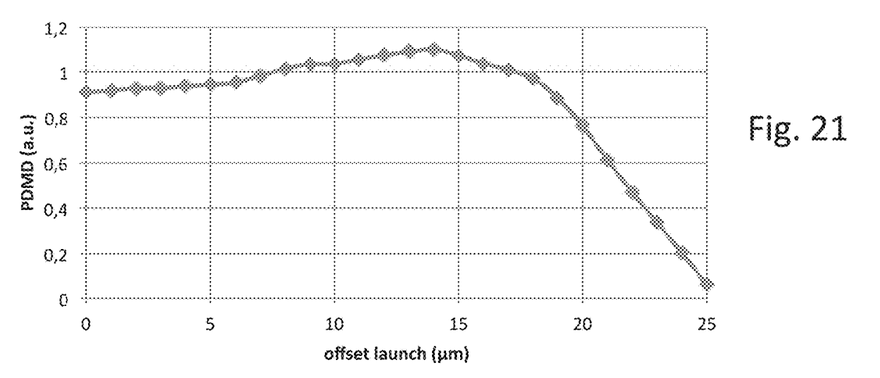
FIG. 21 illustrates the $P_{DMD}$ curve derived from the DMD plot of FIG. 18.

FIG. 18 illustrates a DMD plot obtained by characterizing a multimode fiber through a DMD measurement technique. FIGS. 19 to 21 show respectively the ROB curve, the ROD curve and the $P_{DMD}$ curve as a function of the radial offset value derived from the DMD plot according to the second embodiment of the invention.

Using these three fiber-characteristic curves along with the three source-characteristic curves of FIGS. 5 to 7, the method according to this second embodiment of the invention proposes to compute the Effective Bandwidth (hereafter called EB3) as the bandwidth at −3 dB of the transfer function H(f), such that:

$$10 \cdot \log_{10} \left| \frac{H(EB3)}{H(0)} \right| = -3,$$

with:

$$H(f) = \sum_{r=0}^{r=a} P(r) \cdot P_{DMD}(r) \cdot OMBc(r) \cdot e^{-i2\pi(\Delta\tau(r)+\Delta\tau_{DMD}(r))f} \cdot e^{-\left(\frac{1}{\sigma(r)^2}+\frac{1}{\sigma_{DMD}(r)^2}\right)f^2}$$

with:

$$\Delta\tau(r) = L \cdot D \cdot (\lambda_c(r) - \lambda_{DMD})$$

$$\sigma(r) = \frac{0.187}{\Delta\lambda(r) \cdot L \cdot D \cdot \sqrt{0.3 \cdot \log_e 10}}$$

$$\Delta\tau_{DMD}(r) = L \cdot \frac{\int t \cdot s_{DMD}(r, t) \cdot dt}{L_{DMD} \cdot \int s_{DMD}(r, t) \cdot dt} \sim L \cdot ROD(r)$$

$$\sigma_{DMD}(r) = \frac{ROB(r)}{L \cdot \sqrt{0.3 \cdot \log_e 10}}$$

where:
L is the multimode fiber length in the link (e.g. 500 m),
$L_{DMD}$ is a length of multimode fiber used in the measurement of the Dispersion Modal Delay,
D is the chromatic dispersion of the nominal fiber expressed in ps/nm-km (e.g. −100 ps/nm-km) (the nominal fiber has preferably the same dopants content as the fiber under test),
$\lambda_{DMD}$ is the wavelength of the measurement of the Dispersion Modal Delay,
$s_{DMD}(r,t)$ is a DMD trace at radial offset value r,
and OMBc(r) is the OMBc (for "Overfilled Modal Bandwidth calculated") weight function.

Figure 8:
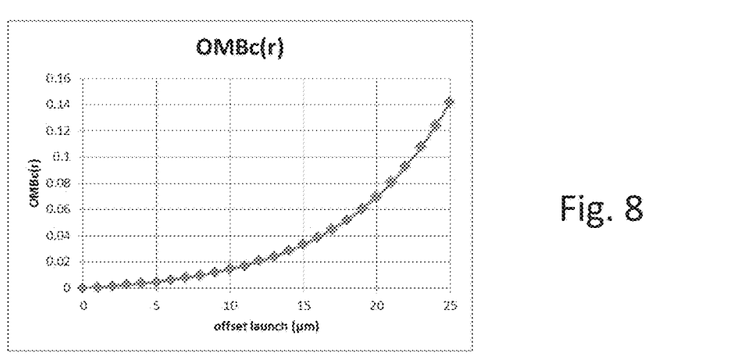
FIG. 8 illustrates the OMBc weight function used in an exemplary embodiment of the invention.

Referring back to the exemplary embodiment illustrated through FIGS. 4 to 7, the theoretical Effective Bandwidth (that requires eigenmode computations, and thus accurate knowledge of the source and the fiber), and the EB3 Effective Bandwidth have been computed for a few fibers. FIG. 8 illustrates the OMBc weight function used in this exemplary embodiment.

The fibers were simulated as perfect alpha profile with alpha varying between 2.05 and 2.08. The DMD measurement of these fibers was also simulated. The graph on FIG. 9 reports the theoretical Effective Bandwidth EB and the EB3 Effective Bandwidth obtained for these fibers and for this given source as a function of alpha: the agreement is excellent.

Figure 9:
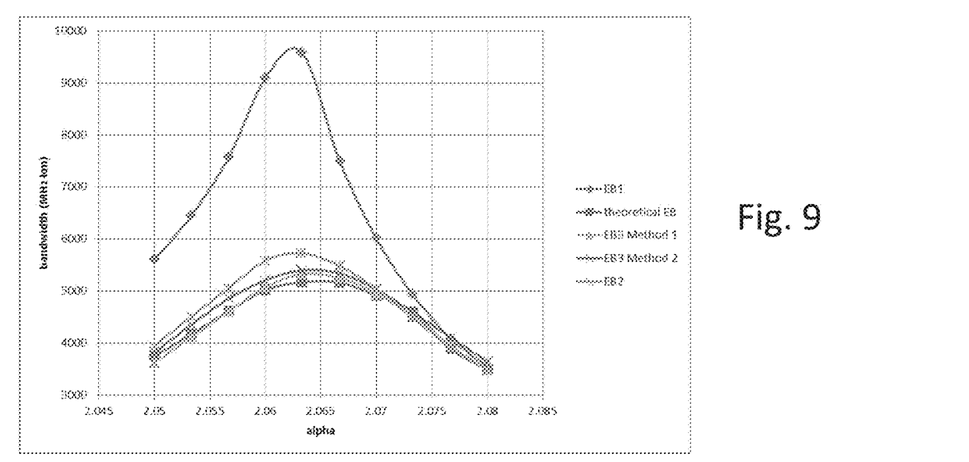
FIG. 9 shows a comparison of a theoretical Effective Bandwidth, and of an Effective Bandwidth computed according two embodiments of the invention, as well as Effective Bandwidths computed according to prior art technique.

Referring to the caption box of FIG. 9:
"theoretical EB" corresponds to the theoretical Effective Bandwidth obtained from eigenmode computation and accurate knowledge of the source and the fiber;
"EB3 Method 1" corresponds to the Effective Bandwidth computed according to the first embodiment of the invention;
"EB3 Method 2" corresponds to the Effective Bandwidth computed according to the second embodiment of the invention;
EB1 corresponds to the Effective Bandwidth assessed through prior art techniques such as those disclosed in patent documents EP2144096, U.S. Pat. No. 7,995,888, U.S. Pat. No. 8,260,103, US20100028020 or US20110293290;
EB2 corresponds to the Effective Bandwidth assessed through prior art techniques such as those disclosed in patent documents EP2584388 or US20130100437. Such techniques are relatively complex, since they require an a priori knowledge of the source.

Figure 10:
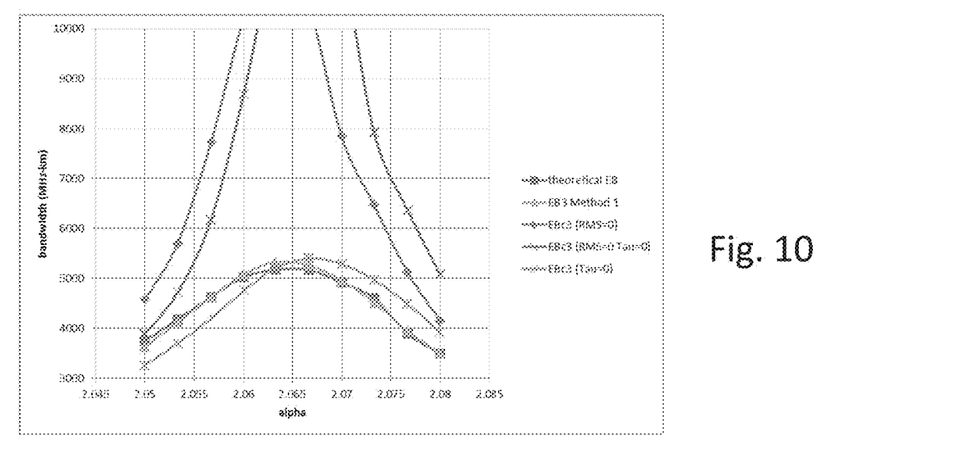
FIG. 10 illustrates the importance for characterizing the source of the source metrics $\lambda_c(r)$ and $\Delta\lambda(r)$ derived according to embodiments of the invention, as well as their influence on the computation of the Effective Bandwidth of an optical link.

FIG. 10 illustrates the importance for characterizing the source of the source metrics $\lambda_c(r)$ and $\Delta\lambda(r)$ derived according to embodiments of the invention, as well as their influence on the computation of the Effective Bandwidth of an optical link. Actually, referring to the caption box of FIG. 10:
"theoretical EB" corresponds to the theoretical Effective Bandwidth obtained from eigenmode computation and accurate knowledge of the source and the fiber;
"EB3 Method 1" corresponds to the Effective Bandwidth computed according to the first embodiment of the invention;
"EBc3 (RMS=0)" corresponds to the Effective Bandwidth computed according to the first embodiment of the invention, but by neglecting the RMS spectral width of the source ($\Delta\lambda(r)=0$);
"EBc3 (RMS=0 Tau=0)" corresponds to the Effective Bandwidth computed according to the first embodiment of the invention, but by neglecting both the RMS spectral width of the source ($\Delta\lambda(r)=0$) and the central wavelength distribution of the source ($\lambda_c(0=0)$);
"EBc3 (Tau=0)" corresponds to the Effective Bandwidth computed according to the first embodiment of the invention, but by neglecting the central wavelength distribution of the source ($\lambda_c(r)=0$).

Figure 11:
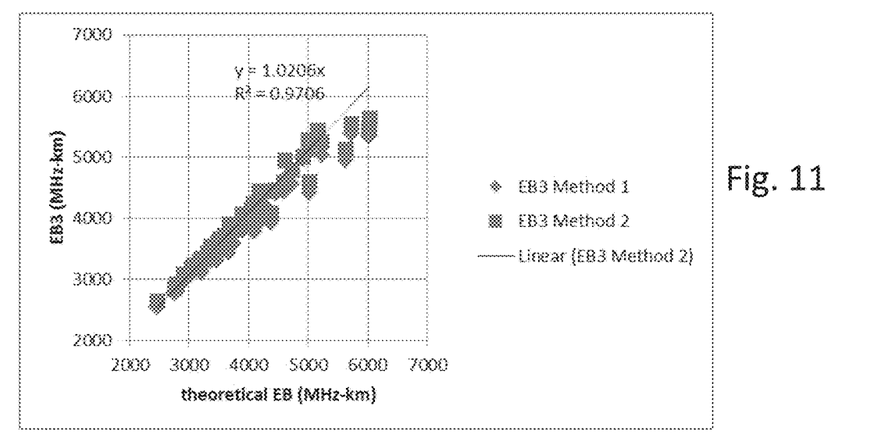
FIG. 11 shows a comparison between the theoretical Effective Bandwidth, and the EB3 Effective Bandwidth computed according to the first and second embodiments of the invention.

The inventors have simulated a plurality of links using the method of characterizing a multimode fiber link according to the first and second embodiments of the invention. FIG. 11 shows a comparison between the theoretical Effective Bandwidth, and the EB3 Effective Bandwidth computed according to the first and second embodiments of the invention. As can be observed, both computations of EB3 provide results, which are close to the theoretical EB.

FIGS. 12A-12C to FIG. 14 show another exemplary embodiment of the invention, which illustrates that the third source characteristic curve showing the RMS spectral width as a function of the radial offset value is critical for the assessment of the total bandwidth EB3.

Figure 12A:
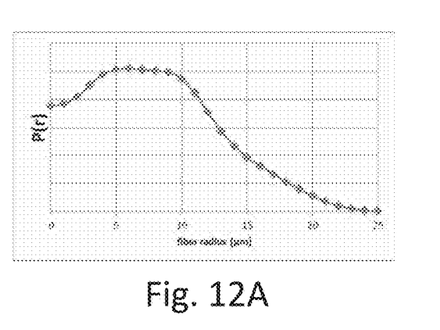
FIGS. 12A, 12B and 12C correspond to the curves of FIGS. 5, 6 and 7 for another exemplary embodiment of the invention.
Figure 12B:
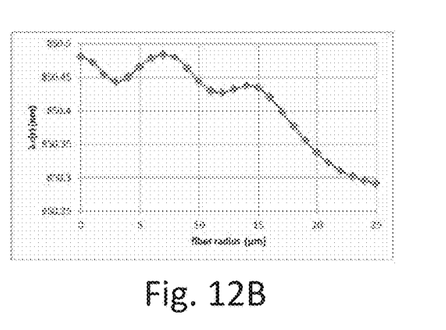
Figure 12C:
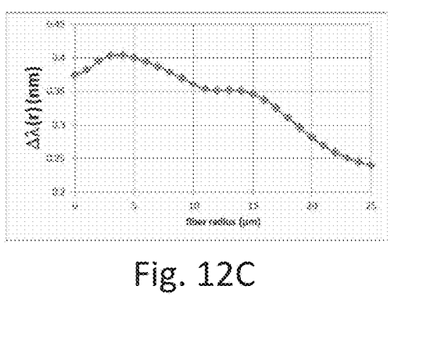

FIGS. 12A to 12C respectively show:
a curve of the output power P(r) as a function of the radial offset value of a VCSEL source;
a curve of the center wavelength $\lambda_c(r)$ as a function of the radial offset value of this VCSEL source;
a curve of the root mean square spectral width $\Delta\lambda(r)$ as a function of the radial offset value of this VCSEL source.

Figure 13:
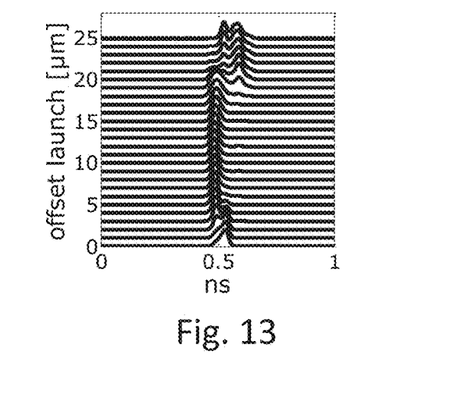
FIG. 13 illustrates the DMD plot obtained through the DMD measurement technique for the multimode fiber of the exemplary embodiment of FIGS. 12A-12C.

FIG. 13 illustrates the DMD plot obtained through the DMD measurement technique for the multimode fiber of this exemplary embodiment.

Figure 14:
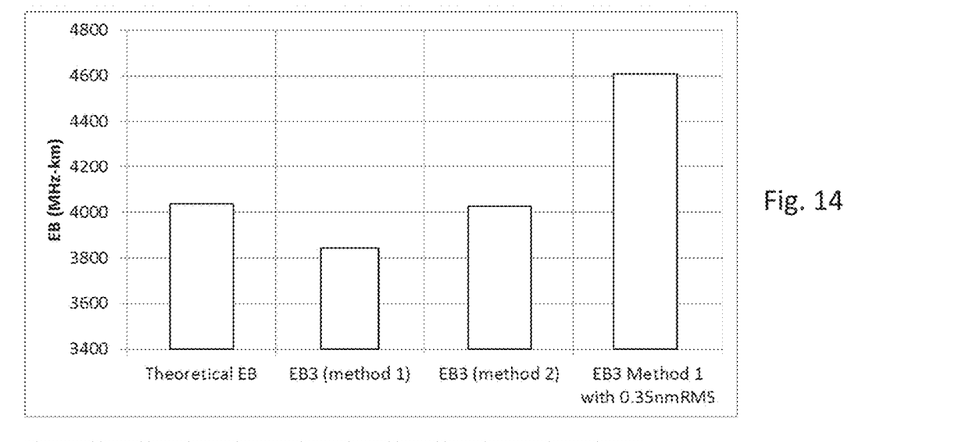
FIG. 14 compares the Effective Bandwidth expressed in MHz-km obtained through different methods for the optical link of the exemplary embodiment of FIGS. 12A-12C.

FIG. 14 compares the Effective Bandwidth expressed in MHz-km obtained for the optical link of this exemplary embodiment:
through calculation of a theoretical EB;
through calculation of the Effective Bandwidth EB3 according to the first embodiment of the invention;
through calculation of the Effective Bandwidth EB3 according to the second embodiment of the invention;
through calculation of the Effective Bandwidth EB3 according to the first embodiment of the invention, by using the 0.35 nm RMS spectral width instead of the complete third curve $\Delta\lambda(r)$ of FIG. 12C.

As can be observed, the Effective Bandwidth of the optical link is significantly overestimated of roughly 15%, when a 0.35 nm RMS spectral width is used instead of the complete third curve $\Delta\lambda(r)$ of FIG. 12C.

Figure 15:
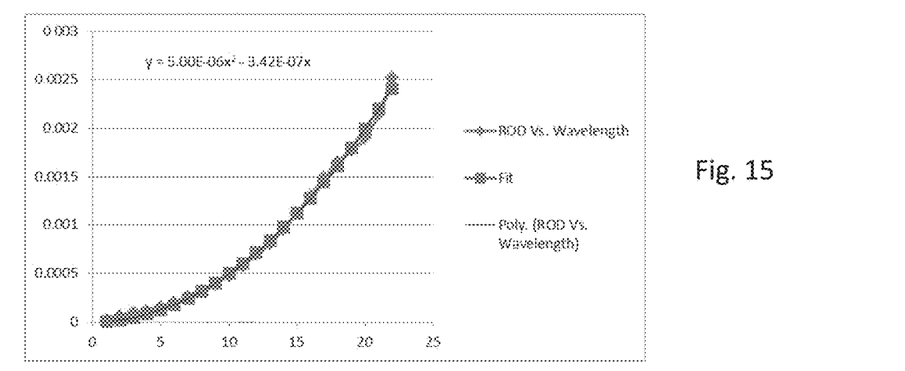
FIGS. 15 and 16 both focus on an enhanced embodiment of the invention.
Figure 16:
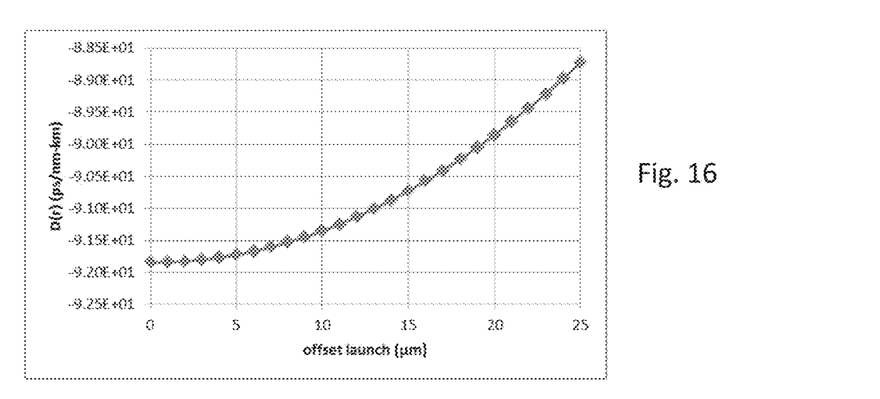

FIGS. 15 and 16 both focus on an enhanced embodiment of the invention.

Actually, both methods described above in relation to the first and second embodiments of the invention work fine when $\lambda_c(r)$ is close to the $\lambda_{DMD}$) wavelength. However, some discrepancy may occur when $\lambda_c(r)$ is too different from the $\lambda_{DMD}$ wavelength. This comes from the fact that Dispersion Modal Delay DMD varies with the operating wavelength $\lambda_{DMD}$) used during the DMD measurements. To account for this phenomenon, one can correct the transfer functions H(f) used in both the first and second embodiments of the invention, by modifying the chromatic dispersion D in the equation of $\Delta\tau(r)$ by a function D(r) of the radius.

More precisely, it is possible to replace $\Delta\tau(r)=L\cdot D\cdot(\lambda_c(r)-_{DMD})$ with $\Delta\tau(r)=L\cdot D(r)\cdot(\lambda_c(r)-\lambda_{DMD})$. Typically, a polynomial of order 2 may be used: $D(r)=D_0+a\cdot r^2+b\cdot r$.

For instance, for a 50 µm graded-index multimode fiber, we can use:

$a = 5.10^{-3}$ ps/nm–km–µm²

$b = -3.42.10^{-4}$ ps/nm–km–µm $D_0 = -91.85$ ps/nm–km

These coefficients can be calculated through chromatic dispersion measurements along radius with DMD like excitation, or with the comparison of ROD curves obtained at two different wavelengths $\lambda_1$ and $\lambda_2$.

The curve on FIG. 15 reports $$\frac{ROD(\lambda_1, r) - ROD(\lambda_2, r)}{\lambda_1 - \lambda_2}.$$

FIG. 16 shows the chromatic dispersion D(r) as a function of radius r. Coefficients a, b, and $D_0$ may depend on the manufacturing process of the fiber or on the dopant content of the fiber.

The method according to embodiments of the invention allow isolating and extracting the relevant information for characterizing both a source and a multimode fiber, into a single set of curves for the source and into a single set of curves for the fiber. A standardized used of such a method would hence considerably simplify sorting method and/or link engineering, and make easier the collaboration between source and fiber manufacturers.

The invention claimed is:

1. A method of characterizing a multimode optical fiber link comprising a light source and at least one multimode fiber, said method comprising a step of characterizing said multimode fiber using a measurement of the Dispersion Modal Delay (DMD) and delivering fiber characteristic data, characterized in that said method also comprises:
   a step of characterizing said light source by at least three source characteristic curves obtained by:
      exciting a nominal multimode fiber with said light source;
      scanning with a single mode fiber an output signal of said nominal multimode fiber, at different radial offset values r, from an axis of said nominal fiber where r=0 to a radial offset value r=a, where a is the core radius of said nominal fiber,
      analyzing with a spectrum analyzer an output optical spectrum of said single mode fiber for each radial offset value r,
   said source characteristic curves each showing a source parameter as a function of said radial offset value r;
   a step of computing an Effective Bandwidth (EB) of said link, comprising calculating a transfer function using both said fiber characteristic data and each of said source characteristic curves.

2. The method according to claim 1, wherein said source characteristic curves comprise:
   a curve showing an output power P(r) of said source as a function of said radial offset value r, 0≤r≤a;
   a curve showing a center wavelength $\lambda_c(r)$ of said source as a function of said radial offset value r, 0≤r≤a;
   a curve showing a root mean square spectral width $\Delta\lambda(r)$ of said source as a function of said radial offset value r, 0≤r≤a.

3. The method according to claim 1, wherein said nominal multimode fiber exhibits a length close to said link length.

4. The method according to claim 1, wherein said step of characterizing said multimode fiber and said step of characterizing said light source use the same single mode fiber.

5. The method according to claim 1, wherein said step of computing an Effective Bandwidth (EB) of said link derives said Effective Bandwidth from a transfer function H(f):
where $$H(f) = \sum_{r=0}^{r=a} P(r) \cdot OMBc(r) \cdot \frac{\tilde{s}_{DMD}\left(r, f \cdot \frac{L}{L_{DMD}}\right)}{\tilde{s}_{ref}\left(f \cdot \frac{L}{L_{DMD}}\right)} \cdot e^{-i2\pi\Delta\tau(r)f} \cdot e^{-\frac{f^2}{\sigma(r)^2}}$$

with:

$$\Delta\tau(r) = L \cdot D \cdot (\lambda_c(r) = \lambda_{DMD})$$

$$\sigma(r) = \frac{0.187}{\Delta\lambda(r) \cdot L \cdot D \cdot \sqrt{0.3 \cdot \log_e 10}}$$

where:
$\tilde{s}_{DMD}(r,f)$ and $\tilde{s}_{ref}(f)$ are the Fourier transform of $s_{DMD}(r,t)$ and $s_{ref}(t)$,
L is the multimode fiber length in said link,
$L_{DMD}$ is a length of multimode fiber used in said measurement of the Dispersion Modal Delay,
D is the chromatic dispersion of said nominal fiber expressed in ps/nm-km,
$\lambda_{DMD}$ is the wavelength of said measurement of the Dispersion Modal Delay,
$s_{DMD}(r,t)$ is a DMD trace at radial offset value r,
$s_{ref}(t)$ is a reference pulse signal,
and OMBc(r) is the OMBc (for "Overfilled Modal Bandwidth calculated") weight function.

6. The method according to claim 5, wherein said chromatic dispersion D in Δr(r) is replaced by a function of the radius D(r), such that:

$$\Delta\tau(r) = L \cdot D(r) \cdot (\lambda_c(r) - \lambda_{DMD}).$$

7. The method according to claim 6, wherein $D(r)=D_0+ a \cdot r^2 + b \cdot r$, where $D_0$ a and b are coefficients calculated using a method belonging to the group comprising:
   chromatic dispersion measurements along radius with DMD like excitations;
   comparing ROD curves obtained at two different wavelengths.

8. The method according to claim 1, wherein said step of characterizing said multimode fiber comprises a step of calculating at least three fiber characteristic curves from said measurement of said Dispersion Modal Delay, said fiber characteristic curves comprising:
   a curve showing a Radial Offset Bandwidth ROB(r) of said multimode fiber as a function of said radial offset value r, 0≤r≤a;
   a curve showing a Radial Offset Delay ROD(r) of said multimode fiber as a function of said radial offset value r, 0≤r≤a;
   a curve showing a Radial Coupling Power $P_{DMD}(r)$ of said multimode fiber as a function of said radial offset value r, 0≤r≤a.

9. The method according to claim 8, wherein said step of computing an Effective Bandwidth (EB) of said link derives said Effective Bandwidth from a transfer function H(f):
where $$H(f) = \sum_{r=0}^{r=a} P(r) \cdot P_{DMD}(r) \cdot OMBc(r) \cdot e^{-i2\pi(\Delta\tau(r) + \Delta\tau_{DMD}(r))f} \cdot e^{-\left(\frac{1}{\sigma(r)^2} + \frac{1}{\sigma_{DMD}(r)^2}\right)f^2}$$

with:

$$\Delta\tau(r) = L \cdot D \cdot (\lambda_c(r) - \lambda_{DMD})$$

$$\sigma(r) = \frac{0.187}{\Delta\lambda(r) \cdot L \cdot D \cdot \sqrt{0.3 \cdot \log_e 10}}$$

$$\Delta\tau_{DMD}(r) = L \cdot \frac{\int t \cdot s_{DMD}(r,t) \cdot dt}{L_{DMD} \cdot \int s_{DMD}(r,t) \cdot dt} \sim L \cdot ROD(r)$$

$$\sigma_{DMD}(r) = \frac{ROB(r)}{L \cdot \sqrt{0.3 \cdot \log_e 10}}$$

where:
L is the multimode fiber length in said link,
$L_{DMD}$ is a length of multimode fiber used in said measurement of the Dispersion Modal Delay,
D is the chromatic dispersion of said nominal fiber expressed in ps/nm-km, $\lambda_{DMD}$ is the wavelength of said measurement of the Dispersion Modal Delay, $s_{DMD}(r,t)$ is a DMD trace at radial offset value r, and OMBc(r) is the OMBc (for "Overfilled Modal Bandwidth calculated") weight function.

10. The method according to claim 9, wherein said chromatic dispersion D in $\Delta\tau(r)$ is replaced by a function of the radius D(r), such that:

$$\Delta\tau(r)=L\cdot D(r)\cdot(\lambda_c(r)-\lambda_{DMD}).$$

11. The method according to claim 10, wherein $D(r)=D_0+a\cdot r^2+b\cdot r$, where $D_0$ a and b are coefficients calculated using a method belonging to the group comprising:

chromatic dispersion measurements along radius with DMD like excitations;

comparing ROD curves obtained at two different wavelengths.

12. The method of fabricating multimode optical fiber links comprising a light source and a multimode fiber, the method comprising:

selecting a set of multimode optical fibers and a set of light sources;

for each multimode optical fiber and for each light source in said sets, characterizing the multimode optical fiber link formed with said multimode optical fiber and said light source by (i) characterizing said multimode fiber using a measurement of the Dispersion Modal Delay (DMD) and delivering fiber characteristic data, (ii) characterizing said light source by at least three source characteristic curves obtained by exciting a nominal multimode fiber with said light source, scanning with a single mode fiber an output signal of said nominal multimode fiber, at different radial offset values r, from an axis of said nominal fiber where r=0 to a radial offset value r=a, where a is the core radius of said nominal fiber, and analyzing with a spectrum analyzer an output optical spectrum of said single mode fiber for each radial offset value r, wherein said source characteristic curves each show a source parameter as a function of said radial offset value r, and (iii) computing an Effective Bandwidth (EB) of said link, comprising calculating a transfer function using both said fiber characteristic data and each of said source characteristic curves;

selecting only those multimode optical fiber links for which the effective bandwidth EB>3000 MHz-km.

13. The method according to claim 12, wherein said step of selecting only those multimode optical fiber links for which the effective bandwidth EB>3000 MHz-km comprises selecting only those multimode optical fiber links for which the effective bandwidth EB>4500 MHz-km.

14. The method according to claim 12, wherein said step of selecting only those multimode optical fiber links for which the effective bandwidth EB>3000 MHz-km comprises selecting only those multimode optical fiber links for which the effective bandwidth EB>6000 MHz-km.

15. The method of selecting multimode optical fibers from a batch of multimode optical fibers, the method comprising:

selecting a batch of multimode optical fibers and a set of light source metrics;

for each multimode optical fiber and each light source metric in said set, characterizing the multimode optical fiber link formed with said multimode optical fiber and said light source metric by (i) characterizing said multimode fiber using a measurement of the Dispersion Modal Delay (DMD) and delivering fiber characteristic data, (ii) characterizing said light source by at least three source characteristic curves obtained by exciting a nominal multimode fiber with said light source, scanning with a single mode fiber an output signal of said nominal multimode fiber, at different radial offset values r, from an axis of said nominal fiber where r=0 to a radial offset value r=a, where a is the core radius of said nominal fiber, and analyzing with a spectrum analyzer an output optical spectrum of said single mode fiber for each radial offset value r, wherein said source characteristic curves each show a source parameter as a function of said radial offset value r, and (iii) computing an Effective Bandwidth (EB) of said link, comprising calculating a transfer function using both said fiber characteristic data and each of said source characteristic curves;

selecting only those multimode optical fibers for which the minimal calculated effective bandwidth over the whole set of light source metrics is >3000 MHz-km, wherein the set of light source metrics is obtained through measuring or modeling a representative set of light sources.

16. The method according to claim 15, wherein said step of selecting only those multimode optical fibers for which the minimal calculated effective bandwidth over the whole set of light source metrics is >3000 MHz-km comprises selecting only those multimode optical fibers for which the minimal calculated effective bandwidth over the whole set of light source metrics is >4500 MHz-km.

17. The method according to claim 15, wherein said step of selecting only those multimode optical fibers for which the minimal calculated effective bandwidth over the whole set of light source metrics is >3000 MHz-km comprises selecting only those multimode optical fibers for which the minimal calculated effective bandwidth over the whole set of light source metrics is >6000 MHz-km.

* * * * *

UNITED STATES PATENT AND TRADEMARK OFFICE
CERTIFICATE OF CORRECTION

PATENT NO. : 9,871,584 B2
APPLICATION NO. : 15/028619
DATED : January 16, 2018
INVENTOR(S) : Molin et al.

Page 1 of 1

It is certified that error appears in the above-identified patent and that said Letters Patent is hereby corrected as shown below:

In the Claims

Claim 5, Column 17 delete Line 57 and insert:
-- $\Delta\tau(r)=L \cdot D(r) \cdot (\lambda_c(r)-\lambda_{DMD})$. --

Claim 6, Column 18 delete Line 10 and insert:
-- matic dispersion D in $\Delta\tau(r)$ is replaced by a function of the --

Signed and Sealed this
Seventeenth Day of April, 2018

Andrei Iancu
*Director of the United States Patent and Trademark Office*